(12) United States Patent
Al-Boghail et al.

(10) Patent No.: US 11,852,572 B2
(45) Date of Patent: Dec. 26, 2023

(54) WETTABILITY ASSESSMENT OF FRACTURING PROPPANTS FOR IMPROVING FLUID RECOVERY

(71) Applicant: Saudi Arabian Oil Company, Dhahran (SA)

(72) Inventors: Fawaz M. Al-Boghail, Dammam (SA); Abdullah M. Al Moajil, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 17/306,348

(22) Filed: May 3, 2021

(65) Prior Publication Data
US 2022/0349801 A1 Nov. 3, 2022

(51) Int. Cl.
| | |
|---|---|
| G01N 13/00 | (2006.01) |
| G01N 13/02 | (2006.01) |
| E21B 43/267 | (2006.01) |
| G01N 11/00 | (2006.01) |

(52) U.S. Cl.
CPC ........... *G01N 13/02* (2013.01); *E21B 43/267* (2013.01); *G01N 11/00* (2013.01); *G01N 2011/008* (2013.01); *G01N 2013/0208* (2013.01)

(58) Field of Classification Search
CPC ............................................. G01N 2013/0208
See application file for complete search history.

(56) References Cited

U.S. PATENT DOCUMENTS

| | | | |
|---|---|---|---|
| 7,921,911 B2 | 4/2011 | Fuller et al. | |
| 8,946,130 B2 | 2/2015 | Zamora et al. | |
| 9,016,111 B2 | 4/2015 | Stukan et al. | |
| 9,377,392 B2 * | 6/2016 | Rickards | G01N 11/02 |

(Continued)

FOREIGN PATENT DOCUMENTS

| | | |
|---|---|---|
| CN | 104374673 | 2/2015 |
| CN | 204944985 | 1/2016 |
| CN | 106468646 | 3/2017 |

OTHER PUBLICATIONS

Al Moajil et al., "Advanced HSP Ceramic Proppants—An Evaluation and Effect of Fines on Proppant Pack Conductivity," SPE-191182-MS, presented at the SPE Trinidad and Tobago Section Energy Resources Conference, Port of Spain, Trinidad and Tobago, Jun. 25-28, 2018, 9 pages.

(Continued)

*Primary Examiner* — Alexander A Mercado
(74) *Attorney, Agent, or Firm* — Fish & Richardson P.C.

(57) ABSTRACT

Methods, systems, and apparatus for analytical wettability assessment of fracturing proppants for improving fluid recovery are disclosed. Embodiments include determining, for a proppant sample, a first value related to an oil-wet index of the proppant sample. Embodiments further include determining, for the proppant sample, a second value related to a water-wet index of the proppant sample. Embodiments further include determining, for the proppant sample based on the first value and the second value, a third value related to a wettability index of the proppant sample. Embodiments further include determining, based on the third value, a wetting characteristic of the proppant sample. Other embodiments may be described.

7 Claims, 12 Drawing Sheets

(56) References Cited

U.S. PATENT DOCUMENTS

| | | | |
|---|---|---|---|
| 10,017,688 B1 | 7/2018 | Green et al. | |
| 10,301,920 B2 | 5/2019 | Green et al. | |
| 2009/0306898 A1* | 12/2009 | Anschutz | G01N 3/36 73/866 |
| 2010/0163234 A1* | 7/2010 | Fuller | C09K 8/86 166/278 |
| 2019/0316736 A1* | 10/2019 | Jacksier | F17C 13/02 |
| 2020/0182240 A1* | 6/2020 | Nowell | F04B 1/0404 |

OTHER PUBLICATIONS

Anderson, "Wettability Literature Survey—Part 2: Wettability Measurement," Journal of Petroleum Technology, Society of Petroleum Engineers, Nov. 1981, 38(11):1246-1272, 17 pages.

Kruss, "Drop Shape Analyzer DSA100," Dec. 2020, 8 pages.

Neumann et al., "Techniques of Measuring Contact Angles," Surface and Colloid Science, Chapter 2, 31-91, 61 pages.

Donaldson et al., "Wettability Determination and Its Effects on Recovery Efficiency," Society of Petroleum Engineers (SPE), SPE journal, Mar. 1969, 9(1):13-20.

\* cited by examiner

| FLUID | S.G. | MEASUREMENT 1 (°) | MEASUREMENT 2 (°) | MEASUREMENT 3 (°) | AVERAGE (°) |
|---|---|---|---|---|---|
| DEIONIZED WATER | 0.997 | 119.7 | 116.9 | 119.0 | 118.6 |
| CONDENSATE 1 | 0.803 | 104.9 | 106.9 | 108 | 106.3 |
| CONDENSATE 2 | 0.832 | 98.5 | 99.3 | 108 | 102.3 |
| CONDENSATE 3 | 0.768 | 85 | 82.5 | 86 | 84.5 |
| DIESEL | 0.832 | 113.3 | 113.4 | 115 | 113.9 |
| N-PROPANOL | 0.803 | 85.7 | 82.6 | 94.1 | 90.8 |
| HEXANE | 0.658 | | DROP FLATTENS | | |
| OCTANE | 0.703 | | DROP FLATTENS | | |

FIG. 1

| FLUID | AVERAGE (°) | WWI | OWI | WI | NI | WETTABILITY CATEGORY |
|---|---|---|---|---|---|---|
| DEIONIZED WATER | 118.5 | 0.18 | - | - | - | - |
| CONDENSATE 1 | 109.3 | | 0.09 | 0.07 | 0.26 | WEAKLY NEUTRAL |
| CONDENSATE 2 | 102.3 | | 0.07 | 0.09 | 0.24 | WEAKLY NEUTRAL |
| CONDENSATE 3 | 94.5 | | -0.03 | 0.19 | 0.23 | SLIGHTLY WATER WET |
| DIESEL | 110.9 | | 0.13 | 0.00 | 0.29 | WEAKLY NEUTRAL |
| N-PROPANOL | 90.6 | | 0.00 | 0.15 | 0.22 | SLIGHTLY WATER WET |

Determine, for a proppant sample, a first value related to an oil-wet index of the proppant sample
1604

Determine, for the proppant sample, a second value related to a water-wet index of the proppant sample
1608

Determine, for the proppant sample based on the first value and the second value, a third value related to a wettability index of the proppant sample
1612

Determine, based on the third value, a wetting characteristic of the proppant sample
1616

FIG. 16

WETTABILITY ASSESSMENT OF FRACTURING PROPPANTS FOR IMPROVING FLUID RECOVERY

TECHNICAL FIELD

This description relates generally to fracturing proppants, for example, to analytical wettability assessment of fracturing proppants for improving fluid recovery.

BACKGROUND

Hydraulic fracturing proppants are typically solid materials, such as sand or ceramics designed to keep an induced hydraulic fracture open for fracturing. A proppant can be added to a fracturing fluid that can vary in composition. Trade-offs are sometimes made in the material properties of fracturing fluids, such as viscosity, where more viscous fluids can improve a proppant's carrying capacity. The pressure needed for a particular flow that conducts the proppant can also be traded-off with other factors. However, traditional methods to measure wettability of proppants are typically rudimentary, for example, examination using the naked eye or judging a droplet's shape; or indirect such as using the capillary rise method. Therefore, the wettability performance of proppant samples within a wettability category can often not be compared accurately.

SUMMARY

Methods, systems, and apparatus for analytical wettability assessment of fracturing proppants for improving fluid recovery are disclosed. A wettability measurement system removes moisture from at least one fluid line of the wettability measurement system using a solvent. The wettability measurement system injects a proppant sample into a vessel of the wettability measurement system. The vessel has a diameter less than a dimension of a wettability measurement instrument of the wettability measurement system. A flat surface of the wettability measurement system applies pressure on a proppant surface of the proppant sample, such that the proppant surface is level. The wettability measurement system places the vessel into the wettability measurement instrument, such that the vessel is centered with respect to a dropping needle of the wettability measurement system. The dropping needle of the wettability measurement system applies a droplet of deionized water or a hydrocarbon onto the proppant surface. The wettability measurement system captures an image of the droplet contacting the proppant sample to provide a wettability assessment of the proppant sample.

In some implementations, the wettability measurement system determines a contact angle of the droplet and the proppant sample based on the image. The wettability assessment is based on the contact angle.

In some implementations, moisture is removed from the proppant sample using an oven.

In some implementations, the proppant sample is positioned inside the wettability measurement instrument, such that a distance between the dropping needle and the proppant sample is in a range of distances.

In some implementations, the proppant sample is positioned inside the wettability measurement instrument, such that the droplet contacts the proppant sample at a location greater than a threshold distance from a wall of the vessel.

In some implementations, the image of the droplet contacting the proppant sample is captured within a threshold time after the droplet is applied onto the proppant surface.

In some implementations, the vessel is positioned inside the wettability measurement instrument, such that the vessel is level.

In another embodiment, methods, systems, and apparatuses are disclosed for determining, for a proppant sample, a first value related to an oil-wet index of the proppant sample; determining, for the proppant sample, a second value related to a water-wet index of the proppant sample; determining, for the proppant sample based on the first value and the second value, a third value related to a wettability index of the proppant sample; and determining, based on the third value, a wetting characteristic of the proppant sample.

In some implementations, the first value related to the oil-wet index of the proppant sample is based on a contact angle of the proppant with respect to oil.

In some implementations the second value related to the water-wet index of the proppant sample is based on a contact angle of the proppant with respect to water.

Some implementations further include determining, based on the first value and the second value, a fourth value related to a neutrality index; and validating, based on the fourth value, a neutrality of the proppant sample.

In some implementations, the first value relates to an affinity of the proppant sample for oil.

In some implementations, the second value relates to an affinity of the proppant sample for water.

In other embodiments, systems, methods, and apparatus for a three-dimensional (3D)-printed vessel for wettability assessment of fracturing proppants are disclosed. The vessel includes a base component including a threaded cylindrical portion extending outward from a first side of the base component. The cylindrical portion has a particular thread profile. The base component defines a cavity sized to contain a proppant sample. A cap is configured to be screwed onto the threaded cylindrical portion after the proppant sample is injected into the cavity. A surface of the cap is shaped to flatten a proppant surface of the proppant sample. The cap is threaded with the particular thread profile. A pin is configured to be partially screwed onto a second side of the base component before the proppant sample is injected into the cavity. The second side is opposite to the first side.

In some implementations, the vessel is printed using at least one of engineering plastic, tough resin, or acrylonitrile butadiene styrene (ABS).

In some implementations, the cap is further configured to apply pressure to the proppant surface when the cap is screwed onto the threaded cylindrical portion, such that the proppant surface is level.

In some implementations, a diameter of the vessel is in a range from 2.5 cm to 3 cm.

In some implementations, a length of the vessel is in a range from 3 cm to 4 cm.

In some implementations, the pin has a hexagonal opening sized to receive a screwdriver to screw the pin onto the second side of the base component.

In some implementations, the pin is further configured to be fully screwed onto the second side of the base component after the proppant sample is injected into the base component.

In some implementations, the cap is further configured to be tightened by a wrench after the cap is screwed onto the threaded cylindrical portion.

BRIEF DESCRIPTION OF THE DRAWINGS

FIG. 1 illustrates example contact angle values of proppant sample using different fluids, measured at 25° C., in accordance with one or more implementations.

FIG. 16 illustrates an example process for identifying a wettability index of fracturing proppants, in accordance with some implementations.

DETAILED DESCRIPTION

Figure 2A:
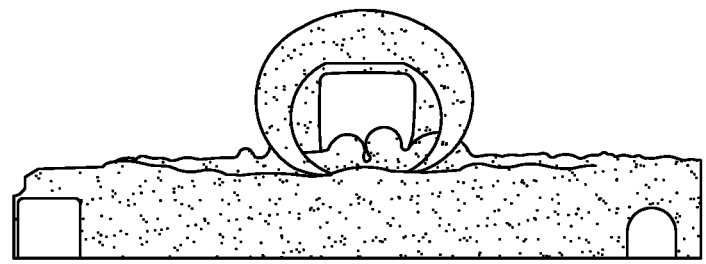
FIG. 2A illustrates example contact angle measurement using deionized water, in accordance with one or more implementations.

The implementations disclosed provide systems and apparatus for a three-dimensional (3D)-printed vessel for wettability assessment of fracturing proppants. Wettability refers to an ability of a liquid to maintain contact with a solid surface. This phenomenon results from the intermolecular interactions between the solid and fluid phases. Wettability can be measured using contact angle analysis. However, for small spherical or irregular particles, direct wettability measurement poses challenges when using traditional methods. Using the implementations disclosed herein, wettability assessment of spherical objects is performed to enable numerical wettability measurements of small spherical surfaces (for example, having a mesh size of 5-80) using a pendent drop method. In some implementations, a drop shape analyzer (DSA) is used.

Among other benefits and advantages, the implementations provide a flexible and integrated system and apparatus for a 3D-printed vessel for wettability assessment of fracturing proppants. The implementations provide direct and precise wettability assessments for fracturing proppants. The direct measurement approach provided by the 3D-printed vessel enables improved classification and comparison of wettability performance for proppant samples having similar wettability features. The measurement success rate improves and measuring time decreases. In addition to improvements in preparing spherical samples for contact angle measurement, the advantages provided by the 3D-printed vessel include a reduced leveling time (proppant preparation), increased efficiency by increasing the success rate, improved ability to prevent the droplet from sinking and falling between proppant particles for a longer period of time, an eliminated wall effect, and improved leveling and maintenance of proppant surfaces. In fact, the implementations disclosed herein are not limited to wettability assessment of proppants and can be applied to wettability assessments of many small irregularly shaped particles.

FIG. 1 illustrates example contact angle values of proppant samples using different fluids, measured at 25° C., in accordance with one or more implementations. The implementations disclosed herein address wettability assessment of small spherical objects, generally. The implementations thus enable and facilitate numerical wettability measurement of small spherical surfaces (for example, having a mesh size of 5-80) using a pendant drop method based on the KRUSS drop shape analysis (DSA)-100. Wettability refers to an ability of a liquid to maintain contact with a solid surface. Wettability results from the intermolecular interactions between the solid and fluid phases. A pendant drop refers to a droplet suspended from a needle in a bulk liquid or gaseous phase. Wettability is assessed by measuring a contact angle between the droplet and the bulk fluid, sometimes called a direct measuring approach. The wettability assessment can include computing the indices illustrated and described in more detail with reference to FIG. 5.

In some implementations, a wettability measurement system injects a proppant sample into a vessel 1200 of the wettability measurement system. The wettability measurement system can include a wettability measurement instrument, such as the KRUSS DSA-100, an actuator (such as implemented in a robotic arm) to perform physical actions on the vessel 1200 and the wettability measurement instrument, and a computer system 1302 to control the wettability measurement instrument and the actuator. The vessel 1200 is further illustrated and described with reference to FIG. 12. The computer system 1302 is further illustrated and described with reference to FIG. 13. The wettability measurement system applies, by a dropping needle, a droplet of deionized water or a hydrocarbon onto the proppant surface. The computer system 1302 captures an image of the droplet contacting the proppant sample to provide a wettability assessment of the proppant sample. The computer system 1302 determines a contact angle of the droplet and the proppant sample based on the image, such that the wettability assessment is based on the contact angle.

Example experiments were conducted to measure the obtained contact angle of proppant samples with deionized water and other hydrocarbon fluid phases. Example results obtained for contact angle measurements and the specific gravity of fluids at T=25° C. are shown in FIG. 1. In FIG. 1, the hydrocarbons labeled "condensate" represent condensate samples having different compositions.

FIG. 2A illustrates example contact angle measurement using deionized water, in accordance with one or more implementations. Example experiments were conducted on high-strength ceramic proppants. The wettability was altered to neutral characteristics by coating the samples. In some implementations, prior to measuring the contact angle, the wettability measurement system removes moisture from at least one fluid line of the wettability measurement system using a solvent. The wettability assessment system is illustrated and described in more detail with reference to FIGS. 1, 11, and 13. To prepare the system for contact angle measurement, the wettability measurement system is calibrated. The fluid lines are cleaned and dried. For example, solvents are used to ensure the absence of fluids inside the lines. This step is performed to prevent fluid remains (for example, leftover fluids from previous measurements) that can mix with the testing phase, and alter its properties and affect the wettability results.

In some implementations, the wettability measurement system removes moisture from the proppant sample using an oven. For example, the proppant samples can be heat aged at a temperature in a range between approximately 50 degrees Celsius (° C.) and approximately 80° C. to ensure moisture removal. It will be understood that this temperature range is intended as an example temperature range, and other temperature ranges may be used in other embodiments based on factors such as the type of proppant, etc.

The proppant samples tested in the experiments with reference to FIG. 2A are high-strength ceramics. The wettability measurement system injects a proppant sample into a vessel 1200 of the wettability measurement system. The vessel 1200 is further illustrated and described with reference to FIG. 12. In some implementations, the vessel 1200 has a diameter less than a dimension of the wettability measurement instrument, described in more detail with reference to FIG. 1. For example, the proppant sample is injected into a transparent semi-cylindrical vessel having an outer diameter that is less than an inner dimension of the wettability measurement instrument.

In some implementations a flat surface of the wettability measurement system is used to apply pressure on a proppant surface of the proppant sample, such that the proppant surface is leveled. For example, the vessel 1200 is filled with the proppant sample and a pressure is applied to the surface of the proppant sample by a flat surface. The flat surface can be a surface of the cap 600, illustrated and described in more detail with reference to FIG. 6. The application of the pressure is repeated until the proppant surface is optimally leveled. The proppant surface is leveled to reduce the effect of spaces between proppant particles.

In some implementations, the wettability measurement system places the proppant sample in the vessel 1200 into the wettability measurement instrument, such that the vessel 1200 is centered with respect to a dropping needle of the wettability measurement system. For example, the leveled proppant sample in the vessel 1200 is placed gently inside the contact angle measuring cell. The vessel 1200 is positioned inside the wettability measurement instrument, such that the vessel 1200 is level. The vessel 1200 is centered below the dropping needle and positioned at the zero horizontal level (that is, not tilted). Instrumentally, leveling the proppant surface by the disclosed implementations, as well as maintaining the leveling of the proppant surface throughout the measurement process, is key to the success of the measurement.

In some implementations, the proppant sample is positioned inside the wettability measurement instrument, such that the droplet contacts the proppant sample at a location greater than a threshold distance from a wall of the vessel 1200. Thus, wall effect is reduced or eliminated. The droplet is prevented from touching or approaching the walls of the vessel 1200 using the disclosed implementations. When traditional methods are used, touching or being close to a vessel wall can cause the droplet's adhesion to be dominated by the wettability of the vessel itself and not the proppant sample. For example, when water is applied to a graduated cylinder, the fluid surface will be curved creating a meniscus caused by the fluid's attachment to the walls. Using the implementations disclosed herein, the proppant sample is positioned accurately below the dropping needle instead to mitigate wall effect. In some implementations, the size of the vessel 1200 is increased, further decreasing the wall effect, for example, in case a wall effect is observed.

In some implementations, the proppant sample is positioned inside the wettability measurement instrument, such that a distance between the dropping needle and the proppant sample is in a range of distances. The dropping needle is thus positioned at a vertical position that is not too far away from the proppant surface nor too close to the proppant surface. A higher vertical position of the dropping needle (greater distance between the dropping needle and the proppant sample) can result in a greater gravitational acceleration force of the falling droplet and cause a scattering of proppant particles upon landing. On the other hand, positioning the dropping needle too close to the proppant surface can cause attachment of a few proppant particles to the droplet before the droplet is completely detached from the dropping needle.

In some implementations, the image of the droplet contacting the proppant sample is captured within a threshold time after the droplet is applied onto the proppant surface. For example, after the droplet is released, the image is frozen within a threshold time in a range of seven to twelve seconds. The threshold time is designed to mitigate the effects of pore spaces between proppant particles. In some implementations, the wettability measurement system (for example, the computer system 1302) determines the contact angle of the droplet and the proppant sample based on the image. The computer system 1302 is further illustrated and described with reference to FIG. 13. The wettability assessment is based on the contact angle. For example, the contact angle of the proppant sample with the droplet phase is computed using software on the computer system 1302. The wettability assessment can include computing the indices illustrated and described in more detail with reference to FIG. 5. Because of a combination of unavoidable spaces between proppant particles and gravitational forces, the droplet can sink between proppant particles. Hence, the implementations disclosed herein are used to conduct measurements in a timely fashion; the image of the contact angle is frozen within the threshold time after the droplet is applied. The implementations described herein were used to measure the contact angles of proppant samples with deionized water (FIG. 2A).

Figure 2B:
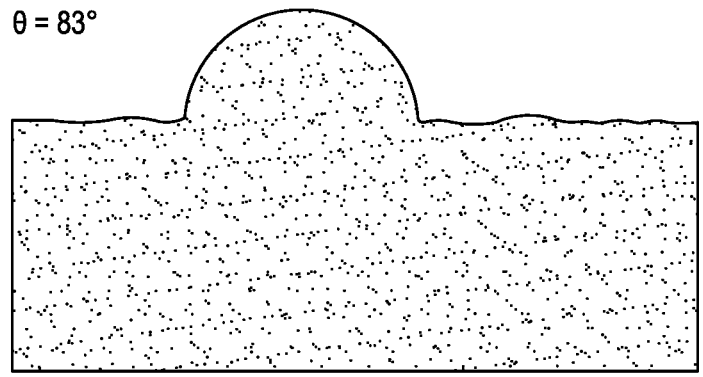
FIG. 2B illustrates example contact angle measurement using a condensate, in accordance with one or more implementations.

FIG. 2B illustrates example contact angle measurement using a condensate, in accordance with one or more implementations. The implementations described herein were used to measure the contact angles of proppant samples with different hydrocarbon fluid phases. The average contact angle measured with deionized water phase was 118.5° compared to a range of 84.5°-113.9° for hydrocarbons, depending on the type. For heavier hydrocarbon components (Hexane and Octane), the droplets flattened out immediately after being dropped, making the measuring of the contact angle more challenging. This indicates that heavier components have a better affinity to the proppant sample, and thus lower values of contact angle (less than 30°).

Figures 3, 4:
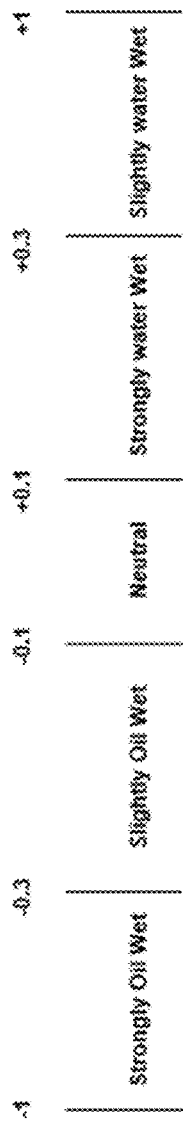
FIG. 3 illustrates an example wettability index, in accordance with one or more implementations.
FIG. 4 illustrates example results of wettability parameters, in accordance with one or more implementations.

FIG. 3 illustrates an example wettability index, in accordance with one or more implementations. The contact angle value for a single phase by itself typically offers less insight into the wettability aspect of a proppant sample, given that wettability refers to the tendency of a fluid to adhere to a surface in the presence of another immiscible fluid. In some implementations, therefore, interpretations of contact angle measurement of one phase (water or oil) are performed in relation to the other phase. For example, two oil and water fluid phases can be related to evaluate an overall wettability for proppant samples. The following equations can be used correlate the contact angle of oil and water phases, and determine a single wettability value to represent the wettability status of proppant samples.

$$OWI=(180-\theta_{oil})/180 \quad (1)$$

Here OWI denotes an oil-wet index and $\theta_{oil}$ denotes the contact angle with respect to oil. Next, $$WWI=(180-\theta_{water})/180 \quad (2)$$

Here, WWI denotes a water-wet index and $\theta_{water}$ denotes a contact angle with respect to water. Equations (1) and (2) can be used to determine a deviation of the contact angle from neutrality for each fluid phase. The values for OWI and WWI are in the range of (0, 1), where zero (0) signifies a complete wetting characteristic and one (1) characterizes a strong adherence of the phase. Similarly, $$WI=WWI-OWI \quad (3)$$

The wettability index "WI" combines the water and oil wettability indices into a single index. The WI index values range from −1, which characterizes a strong oil wettability character to 1, indicating a strong water wettability character. Finally, $$NI = \frac{2}{\sqrt{2}}\sqrt{(0.5 - WWI)^2 + (0.5 - OWI)^2} \quad (4)$$

The neutrality index (NI) refers to a quality control parameter that describes the degree of deviation from neutrality and is given in the range [0,1]. An NI index of zero (0) validates the proppant sample's neutrality, whereas an NI value of one (1) translates to a non-neutral wettability character even if the WI (wettability index value) was zero (0). FIG. 3 thus presents an interpretation of a range of outcomes on the wettability index scale.

FIG. 4 illustrates example results of wettability parameters, in accordance with one or more implementations. In particular, FIG. 4 shows the computed wettability index for the exemplary proppant samples. The implementations disclosed herein thus address challenges of direct measuring techniques for a proppant's wettability and the difficulties in measuring the contact angle of spherical or irregular, small objects.

Figure 5:
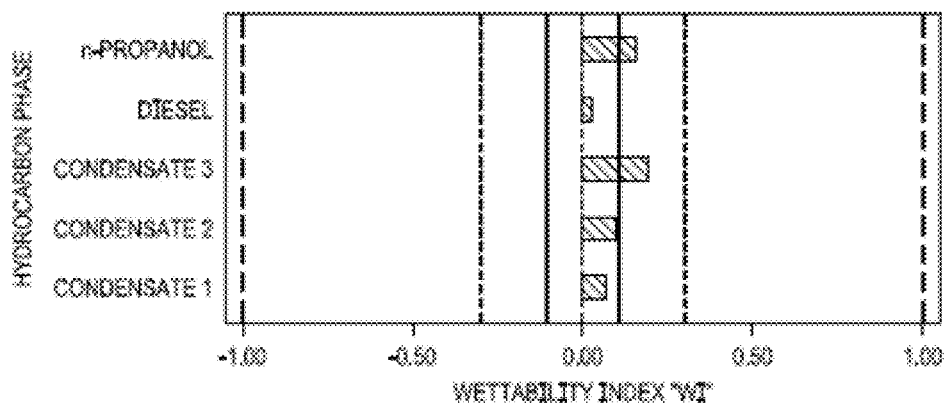
FIG. 5 illustrates an example visualization of a computed wettability index of different hydrocarbons, in accordance with one or more implementations.

FIG. 5 illustrates an example visualization of a computed wettability index of different hydrocarbons, in accordance with one or more implementations. In particular, FIG. 5 shows that the wettability of proppant samples exhibit a relatively similar wettability status when tested with different hydrocarbon phases. Based on the wettability index, the experimental results show that the overall wettability of the proppant samples can be characterized as neutral to slightly water-wet. Although the proppant samples' wettability index of zero (0) is typically a reflection of neutral wettability, this may not always be true. For example, where water-wet and oil-wet indices are equivalently high (for example, WWI=OWI=0.8), WI is determined to be zero (0). Such a case indicates that the proppant phase has a strong but equal affinity to both aqueous and hydrocarbon phases. Thus, if WI results in a neutral character, checking the degree of neutrality using equation (4) is warranted Neutrality can thus be classified as follows:

NI is in the range [0, 0.1]: the sample is neutral.
NI is within the range [0.1, 0.3]: the sample is weakly neutral.
Else: wettability is non-neutral, with mixed wettability, or can be termed "false neutral".

Figure 6:
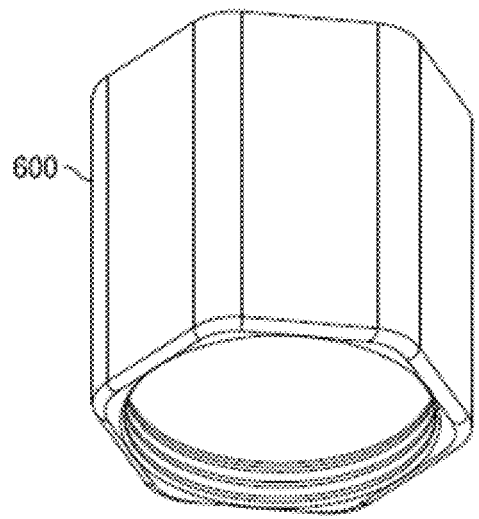
FIG. 6 illustrates an example cap of a three-dimensional (3D)-printed vessel for wettability assessment of fracturing proppants, in accordance with one or more implementations.

FIG. 6 illustrates an example cap 600 of a three-dimensional (3D)-printed vessel 1200 for wettability assessment of fracturing proppants, in accordance with one or more implementations. The vessel 1200 is illustrated and described in more detail with reference to FIG. 12. The vessel 1200 includes a base component 800 that has a threaded cylindrical portion 804. The base component 800 is illustrated and described in more detail with reference to FIG. 8. The cylindrical portion 804 of the base component 800 has a particular thread profile, and the base component 800 also defines a cavity 812 sized to contain a proppant sample. The cavity 812 is illustrated and described in more detail with reference to FIG. 8. The cap 600 is configured to be screwed onto the threaded cylindrical portion 804 after the proppant sample is injected into the cavity 812. A surface of the cap 600 is shaped to flatten a proppant surface of the proppant sample. The cap 600 is also threaded with the particular thread profile of the cylindrical portion 804.

Figure 7:
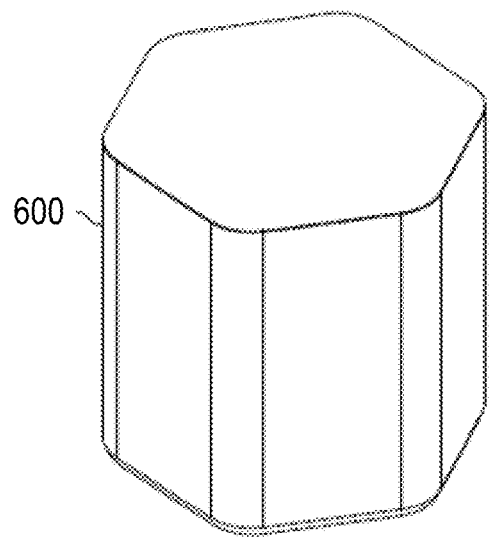
FIG. 7 illustrates an example cap of a 3D-printed vessel for wettability assessment of fracturing proppants, in accordance with one or more implementations.

FIG. 7 illustrates an example cap 600 of a 3D-printed vessel 1200 for wettability assessment of fracturing proppants, in accordance with one or more implementations. The cap 600 is illustrated and described in more detail with reference to FIG. 6. The vessel 1200 is illustrated and described in more detail with reference to FIG. 12. In some implementations, the vessel 1200 (including the cap 600) is 3D printed using at least one of engineering plastic, tough resin, or acrylonitrile butadiene styrene (ABS). Engineering plastic refers to a group of plastic materials that have better mechanical or thermal properties than the more widely used commodity plastics. Examples of engineering plastic include thermoplastic materials. Tough resin is a material that has the feel and mechanical properties of ABS. Tough resin can withstand strain and high stress. For example, parts printed with tough resin can have a tensile strength of 55.7 MPa and a 2.7 GPa modulus of elasticity. ABS refers to a thermoplastic polymer having impact resistance and toughness.

However, it will be noted that in other embodiments the vessel 1200 and/or the cap 600 can be or include a metallic material, a non-metallic material, or some combination thereof. For example, in some embodiments the vessel 1200 and/or the cap 600 can be or include a non-metallic material that is based on a technique such as fused deposition modeling (FDM), stereolithography (SLA), selective laser sintering (SLS), material jetting (MJ), or some other non-metallic material or technique. Additionally or alternatively, the vessel 1200 and/or cap 600 can be or include a metallic material that is based on a technique such as selective laser melting (SLM). Some materials that can be used for the vessel 1200 and/or the cap 600 can be or include polylactide (PLA), carbon reinforced PLA, polyethylene terephthalate glycol (PETG), ABS, nylon 12 (PA12), tough resin, carbon reinforced resin, stainless steel 316L, 718 nickel alloy, or some other similar or appropriate material. It will be understood that these listed techniques or materials are intended as examples herein, and other embodiments may include different techniques or materials for one or both of the vessel 1200 and the cap 600.

In some implementations, the cap 600 is configured to apply pressure to the proppant surface when the cap 600 is screwed onto the threaded cylindrical portion 804, such that the proppant surface is level. The threaded cylindrical portion 804 is illustrated and described in more detail with reference to FIG. 8. In some implementations, the cap 600 is further configured to be tightened by a wrench after the cap 600 is screwed onto the threaded cylindrical portion 804. In some embodiments, a wrench, hex key, or some other type of device is printed of the same material as the cap 600, and used to tighten or loosen the cap 600. In this embodiment, the use of the device to tighten or loosen the cap 600 can help reduce or eliminate wear and tear on the cap 600.

Figure 8:
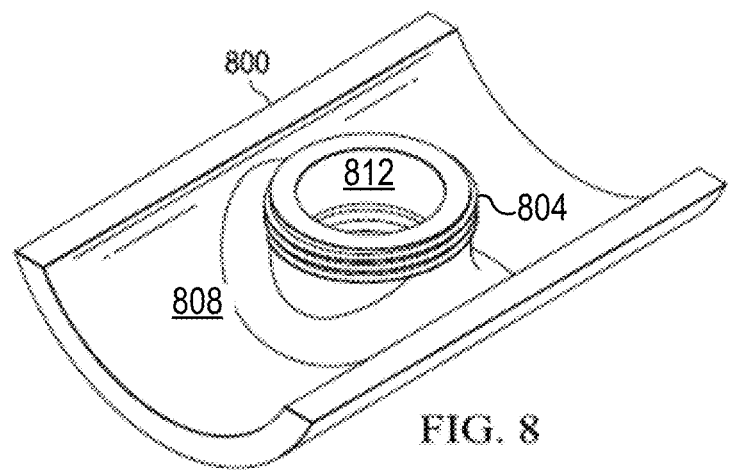
FIG. 8 illustrates an example base component of a 3D-printed vessel for wettability assessment of fracturing proppants, in accordance with one or more implementations.

FIG. 8 illustrates an example base component 800 of a 3D-printed vessel for wettability assessment of fracturing proppants, in accordance with one or more implementations. In some implementations, the base component 800 has a threaded cylindrical portion 804 extending outward from a first side 808 of the base component 800. The cylindrical portion 804 has a particular thread profile. For example, a screw mechanism having a thread profile of #8-63 inch can be used, which results in a beneficial pitch to compress the proppant. Such a thread profile is also amenable to be manufactured using 3D printing. To flatten and level the proppant surface by compaction, the cap 600 has the same thread profile. The cap 600 is illustrated and described in more detail with reference to FIGS. 6, 7. The cap 600 is screwed onto the base component 800 after injecting the proppant into a cavity 812. The base component 800 defines a cavity 812 sized to contain a proppant sample. The cap 600 is configured to be screwed onto the threaded cylindrical portion 804 after the proppant sample is injected into the cavity 812. In some implementations, the vessel 1200 (and thus base component 800) is 3D printed using at least one of engineering plastic, tough resin, or ABS.

Figure 9:
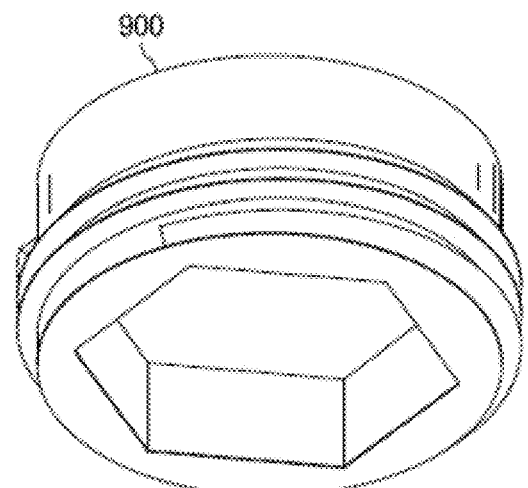
FIG. 9 illustrates an example pin of a 3D-printed vessel for wettability assessment of fracturing proppants, in accordance with one or more implementations, in accordance with one or more implementations.

FIG. 9 illustrates an example pin 900 of a 3D-printed vessel 1200 for wettability assessment of fracturing proppants, in accordance with one or more implementations. The vessel 1200 is illustrated and described in more detail with reference to FIG. 12. The pin 900 is configured to be partially screwed onto a second side 1104 of the base component 800 before the proppant sample is injected into the cavity 812. The second side 1104 is illustrated and described in more detail with reference to FIG. 11. The cavity 812 is illustrated and described in more detail with reference to FIG. 8. The second side 1104 of the base component 800 is opposite to the first side 808 of the base component 800. The first side 808 of the base component 800 is illustrated and described in more detail with reference to FIG. 8.

In some implementations as shown in FIG. 9, the pin 900 has a hexagonal opening sized to receive a screwdriver to screw the pin 900 onto the second side 1104 of the base component 800. For example, the pin 900 can be designed with a 4.3 mm hexagonal opening for a screwdriver. After injecting the proppant sample into the vessel 1200, the cap 600 is tightened (for example, using a 14 mm wrench). While the proppant sample is enclosed within the vessel 1200, the pin 900 is fully screwed in until it tightens. The cap 600 can then be opened, such that the proppant sample is ready for the test. In some implementations, the vessel 1200 (and thus pin 900) is 3D printed using at least one of materials or techniques described above.

Figure 10:
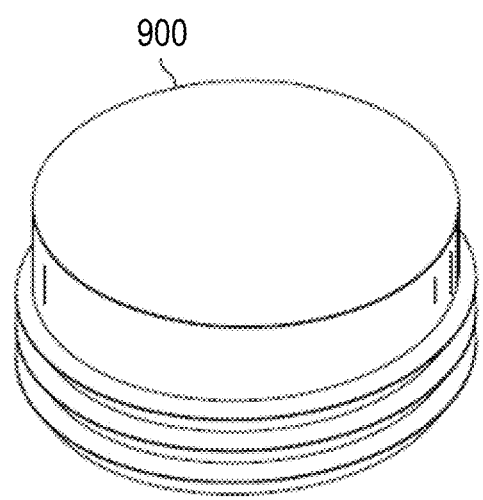
FIG. 10 illustrates an example pin of a 3D-printed vessel for wettability assessment of fracturing proppants, in accordance with one or more implementations.

FIG. 10 illustrates an example pin 900 of a 3D-printed vessel 1200 for wettability assessment of fracturing proppants, in accordance with one or more implementations. The vessel 1200 is illustrated and described in more detail with reference to FIG. 12. In some implementations, the pin 900 is configured to be fully screwed onto a second side 1104 of the base component 800 after the proppant sample is injected into the cavity 812. The second side 1104 is illustrated and described in more detail with reference to FIG. 11. The base component 800 and cavity 812 are illustrated and described in more detail with reference to FIGS. 8, 11.

Figure 11:
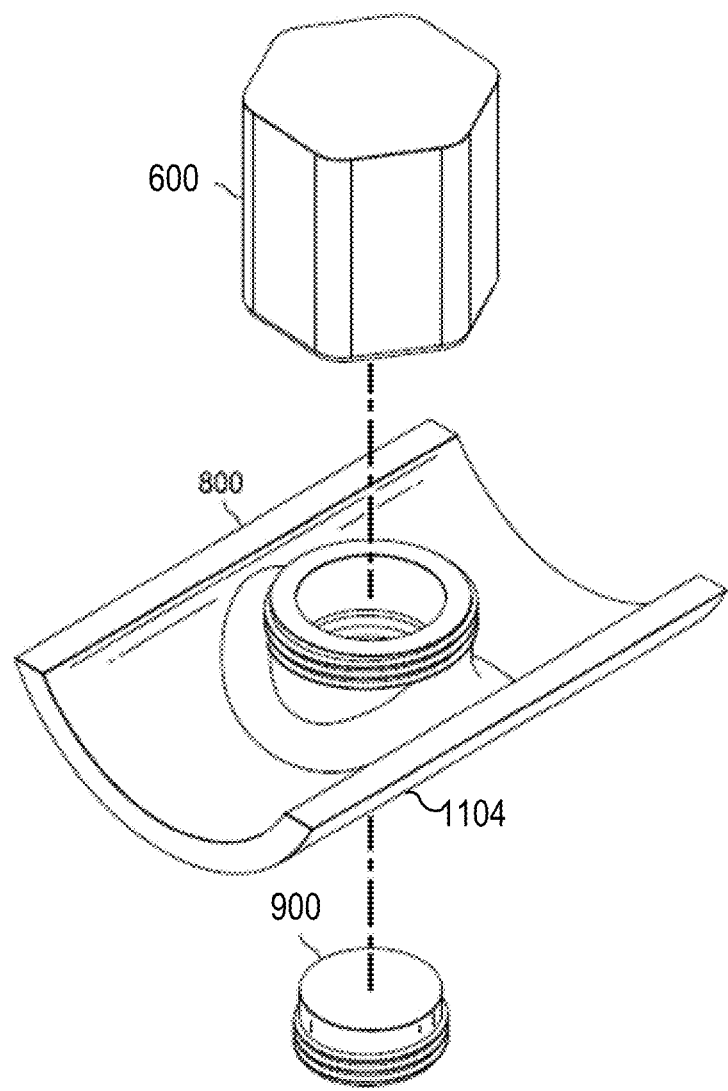
FIG. 11 illustrates example components of a 3D-printed vessel for wettability assessment of fracturing proppants, in accordance with one or more implementations.

FIG. 11 illustrates example components of a 3D-printed vessel 1200 for wettability assessment of fracturing proppants, in accordance with one or more implementations. The vessel 1200 is illustrated and described in more detail with reference to FIG. 12. The vessel 1200 includes a base component 800 having a threaded cylindrical portion 804 extending outward from a first side 808 of the base component 800. The threaded cylindrical portion 804 and first side 808 are illustrated and described in more detail with reference to FIG. 8. The cylindrical portion 804 has a particular thread profile. The base component 800 defines a cavity 812 sized to contain a proppant sample. The cavity 812 is illustrated and described in more detail with reference to FIG. 8. A cap 600 is configured to be screwed onto the threaded cylindrical portion 804 after the proppant sample is injected into the cavity 812. A surface of the cap 600 is shaped to flatten a proppant surface of the proppant sample. The cap 600 is threaded with the same, particular thread profile. A pin 900 is configured to be partially screwed onto a second side 1104 of the base component 800 before the proppant sample is injected into the cavity 812. The second side 1104 is opposite to the first side 812.

Figure 12:
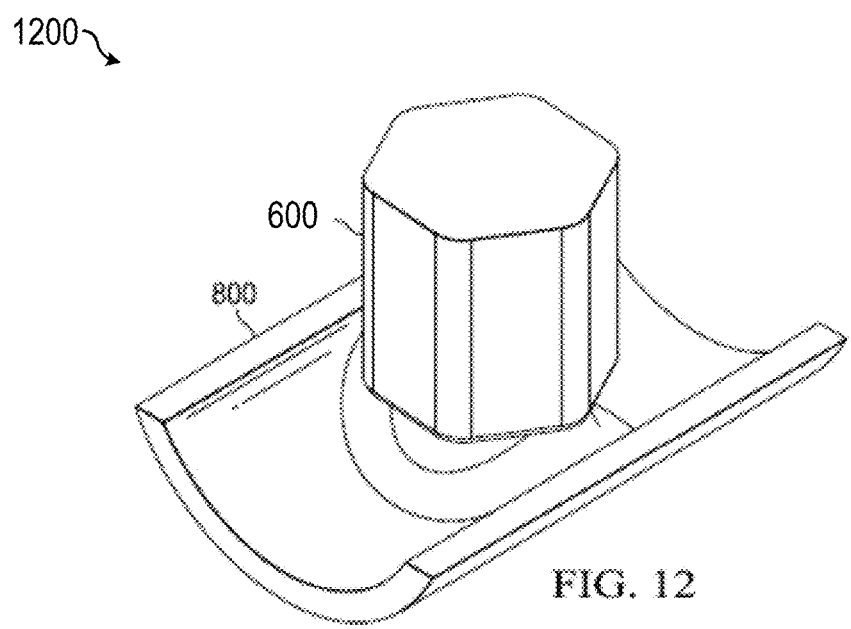
FIG. 12 illustrates an example assembly of a 3D-printed vessel for wettability assessment of fracturing proppants, in accordance with one or more implementations.

FIG. 12 illustrates an example assembly of a 3D-printed vessel 1200 for wettability assessment of fracturing proppants, in accordance with one or more implementations. In particular, FIG. 12 shows the cap 600 screwed onto the threaded cylindrical portion 804 of the base component 800. The cap 600 is illustrated and described in more detail with reference to FIG. 6. The threaded cylindrical portion 804 and the base component 800 are illustrated and described in more detail with reference to FIG. 8. The cap 600 is threaded with the same, particular thread profile as the base component. Not visible in FIG. 12 is the pin 900, which is screwed onto a second side 1104 of the base component 800. The second side 1104 is illustrated and described in more detail with reference to FIG. 11.

In some implementations, the 3D-printed vessel 1200 is part of a wettability measurement system. The wettability measurement system is described in more detail with reference to FIGS. 1, 2A. The wettability measurement system includes a wettability measurement instrument and the vessel 1200. The wettability measurement instrument is also described in more detail with reference to FIGS. 1, 2A. The wettability measurement instrument includes a housing (sometimes referred to as a cell) and a dropping needle attached to the housing. The dropping needle is to apply a droplet of deionized water or a hydrocarbon to the proppant sample. The vessel 1200 is configured to be placed into the housing of the wettability measurement instrument, such that the vessel 1200 is centered with respect to the dropping needle.

The vessel 1200 is used for wettability assessment of small spherical objects, for example, proppant samples. The vessel 1200 thus enables numerical wettability measurement of small spherical surfaces using a pendant drop method. Wettability measurement is performed using the contact angle technique. The proppant samples used are small spherical objects of material that is used in reservoir hydraulic fracturing primarily to keep an induced fracture open. The wettability of the proppants thus plays an important role in increasing the flow back of fracturing fluids and the recovery of produced hydrocarbons. Wettability measurement is needed for proppants to assess the degree of neutrality or their deviation from neutral wettability character (that is, oil or water preferentiality).

The assembled vessel 1200 is designed to fit inside a built-in housing of a contact angle determination system (for example, the KRUSS DSA-100). However, the vessel 1200 as is, or with minor design modification, can fit in various contact angle-measuring equipment available in the market. The contact angle determination system is sometimes referred to as a wettability measurement instrument. In some implementations, the vessel 1200 has a diameter in a range from 2.5 cm to 3 cm, however in other embodiments the diameter of the vessel 1200 can be larger or smaller. The diameter of the vessel 1200 can be based on, for example, the equipment in which the vessel 1200 is intended to fit. Such a diameter size prevents the wall effect because the diameter of the vessel 1200 is three times the size of the droplet. In addition, the design and dimensions of the vessel 1200 can be modified to fit within other contact angle determination systems. A purpose of the vessel 1200 is to compact the proppant in a limited space. In some implementations, a length of the vessel 1200 is in a range from 3 cm to 4 cm. However, in other embodiments the length of the vessel 1200 can be larger or smaller. The length of the vessel 1200 can be based on, for example, the equipment in which the vessel 1200 is intended to fit. The length of the vessel 1200 is important to ensuring the stability of the proppant while it is transferred and placed into the measuring instrument. For example, an optimal example length is 3.5 cm. The proppant capacity inside the vessel 1200 is designed to be relatively small to reduce the amount of material used in manufacturing and to optimize the amount of proppant particles used in testing.

Figure 13:
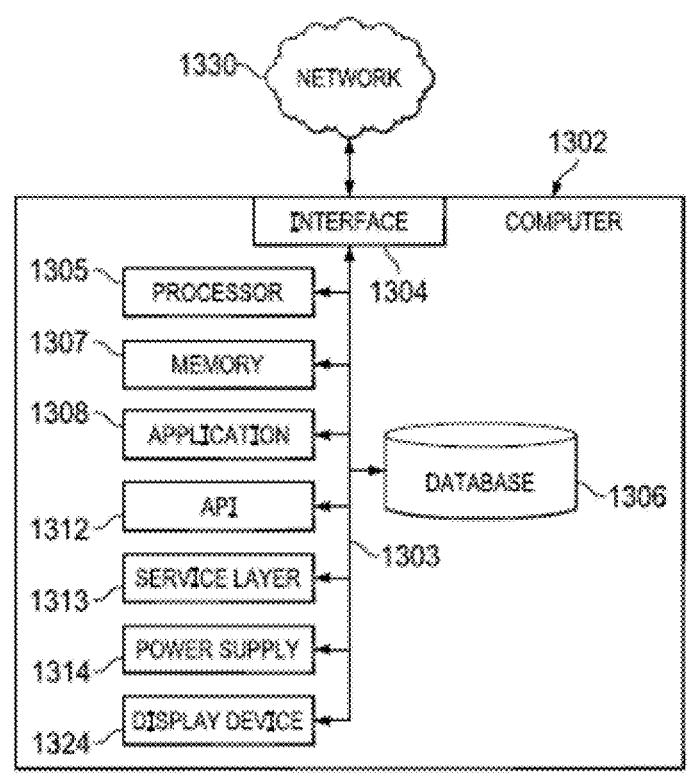
FIG. 13 illustrates an example computer system for wettability assessment of fracturing proppants, in accordance with one or more implementations.

FIG. 13 illustrates an example computer system for wettability assessment of fracturing proppants, in accordance with one or more implementations. In the example implementation, the computer system is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system includes a bus 1302 or other communication mechanism for communicating information, and one or more computer hardware processors 1308 coupled with the bus 1302 for processing information. The hardware processors 1308 are, for example, general-purpose microprocessors. The computer system also includes a main memory 1306, such as a random-access memory (RAM) or other dynamic storage device, coupled to the bus 1302 for storing information and instructions to be executed by processors 1308. In one implementation, the main memory 1306 is used for storing temporary variables or other intermediate information during execution of instructions to be executed by the processors 1308. Such instructions, when stored in non-transitory storage media accessible to the processors 1308, render the computer system into a special-purpose machine that is customized to perform the operations specified in the instructions.

In an embodiment, the computer system further includes a read only memory (ROM) 1310 or other static storage device coupled to the bus 1302 for storing static information and instructions for the processors 1308. A storage device 1312, such as a magnetic disk, optical disk, solid-state drive, or three-dimensional cross point memory is provided and coupled to the bus 1302 for storing information and instructions.

In an embodiment, the computer system is coupled via the bus 1302 to a display 1324, such as a cathode ray tube (CRT), a liquid crystal display (LCD), plasma display, light emitting diode (LED) display, or an organic light emitting diode (OLED) display for displaying information to a computer user. An input device 1314, including alphanumeric and other keys, is coupled to bus 1302 for communicating information and command selections to the processors 1308. Another type of user input device is a cursor controller 1316, such as a mouse, a trackball, a touch-enabled display, or cursor direction keys for communicating direction information and command selections to the processors 1308 and for controlling cursor movement on the display 1324. This input device typically has two degrees of freedom in two axes, a first axis (e.g., x-axis) and a second axis (e.g., y-axis), that allows the device to specify positions in a plane.

According to one embodiment, the techniques herein are performed by the computer system in response to the processors 1308 executing one or more sequences of one or more instructions contained in the main memory 1306. Such instructions are read into the main memory 1306 from another storage medium, such as the storage device 1312. Execution of the sequences of instructions contained in the main memory 1306 causes the processors 1308 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 1312. Volatile media includes dynamic memory, such as the main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that include the bus 1302. Transmission media can also take the form of acoustic or light waves, such as those generated during radio-wave and infrared data communications.

In an embodiment, various forms of media are involved in carrying one or more sequences of one or more instructions to the processors 1308 for execution. For example, the instructions are initially carried on a magnetic disk or solid-state drive of a remote computer. The remote computer loads the instructions into its dynamic memory and send the instructions over a telephone line using a modem. A modem local to the computer system receives the data on the telephone line and use an infrared transmitter to convert the data to an infrared signal. An infrared detector receives the data carried in the infrared signal and appropriate circuitry places the data on the bus 1302. The bus 1302 carries the data to the main memory 1306, from which processors 1308 retrieves and executes the instructions. The instructions received by the main memory 1306 can optionally be stored on the storage device 1312 either before or after execution by processors 1308.

The computer system also includes a communication interface 1318 coupled to the bus 1302. The communication interface 1318 provides a two-way data communication coupling to a network link 1320 that is connected to a local network 1322. For example, the communication interface 1318 is an integrated service digital network (ISDN) card, cable modem, satellite modem, or a modem to provide a data communication connection to a corresponding type of telephone line. As another example, the communication interface 1318 is a local area network (LAN) card to provide a data communication connection to a compatible LAN. In some implementations, wireless links are also implemented. In any such implementation, the communication interface 1318 sends and receives electrical, electromagnetic, or optical signals that carry digital data streams representing various types of information.

The network link 1320 typically provides data communication through one or more networks to other data devices. For example, the network link 1320 provides a connection through the local network 1322 to a host computer 1324 or to a cloud data center or equipment operated by an Internet Service Provider (ISP) 1326. The ISP 1326 in turn provides data communication services through the world-wide packet data communication network now commonly referred to as the "Internet" 1328. The local network 1322 and Internet 1328 both use electrical, electromagnetic or optical signals that carry digital data streams. The signals through the various networks and the signals on the network link 1320 and through the communication interface 1318, which carry the digital data to and from the computer system, are example forms of transmission media.

The computer system sends messages and receives data, including program code, through the network(s), the network link 1320, and the communication interface 1318. In an embodiment, the computer system receives code for processing. The received code is executed by the processors 1308 as it is received, and/or stored in storage device 1312, or other non-volatile storage for later execution.

Figure 14:
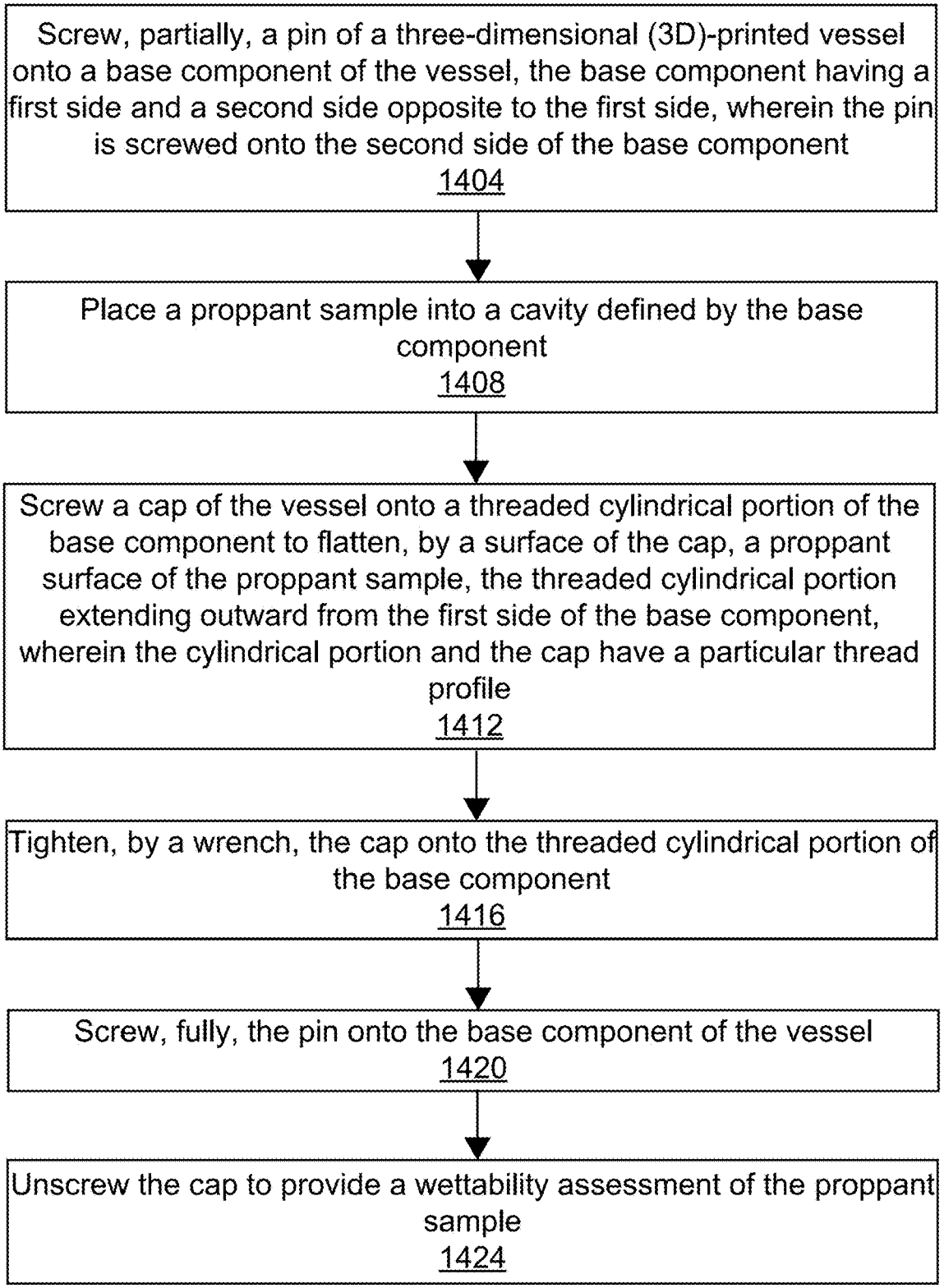
FIG. 14 illustrates an example process for using a 3D-printed vessel for wettability assessment of fracturing proppants, in accordance with one or more implementations.

FIG. 14 illustrates an example process for using a 3D-printed vessel for wettability assessment of fracturing proppants, in accordance with one or more implementations. In some implementations, the process illustrated in FIG. 14 is performed by the wettability assessment system illustrated and described in more detail with reference to FIGS. 11, 13.

The wettability assessment system screws (1404), partially, a pin 900 of a 3D-printed vessel 1200 onto a base component 800 of the vessel 1200. The pin 900 is illustrated and described in more detail with reference to FIGS. 9, 10. The base component 800 is illustrated and described in more detail with reference to FIG. 8. The vessel 1200 is illustrated and described in more detail with reference to FIG. 12. The base component 800 has a first side 808 and a second side 1104 opposite to the first side 808. The first side 808 is illustrated and described in more detail with reference to FIG. 8. The second side 1104 is illustrated and described in more detail with reference to FIG. 11. The pin 900 is screwed onto the second side 1104 of the base component 800.

The wettability assessment system injects (1408) a proppant sample into a cavity 812 defined by the base component 800. The cavity 812 is illustrated and described in more detail with reference to FIG. 8.

The wettability assessment system screws (1412) a cap 600 of the vessel 1200 onto a threaded cylindrical portion 804 of the base component 800 to flatten, by a surface of the cap 600, a proppant surface of the proppant sample. The cap 600 is illustrated and described in more detail with reference to FIG. 6. The threaded cylindrical portion 804 is illustrated and described in more detail with reference to FIG. 8. The threaded cylindrical portion 804 extends outward from the first side 808 of the base component 800. The cylindrical portion 804 and the cap 600 have a particular thread profile. For example, a screw mechanism having a thread profile of #8-63 inch can be used, which results in a beneficial pitch to compress the proppant. Such a thread profile is also amenable to be manufactured using 3D printing. To flatten and level the proppant surface by compaction, the cap 600 has the same thread profile.

The wettability assessment system tightens (1416), by a wrench (for example, using a 14 mm wrench), the cap 600 onto the threaded cylindrical portion 804 of the base component 800. The cap 600 applies pressure to the proppant surface when the cap 600 is screwed onto the threaded cylindrical portion 804 and then tightened, such that the proppant surface is leveled.

The wettability assessment system screws (1420), fully, the pin 900 onto the base component 800 of the vessel 1200. In some implementations as shown in FIG. 9, the pin 900 has a hexagonal opening sized to receive a screwdriver to screw the pin 900 onto the second side 1104 of the base component 800. For example, the pin 900 can be designed with a 4.3 mm hexagonal opening for a screwdriver. While the proppant sample is enclosed within the vessel 1200, the pin 900 is fully screwed in until it tightens. The cap 600 can then be opened, such that the proppant sample is ready for the test.

The wettability assessment system unscrews (1424) the cap 600 to provide a wettability assessment of the proppant sample. For example, the vessel 1200 is placed into a wettability measurement instrument, such that the vessel 1200 is centered with respect to a dropping needle of the wettability measurement instrument. The dropping needle applies a droplet of deionized water or a hydrocarbon onto the proppant surface to provide the wettability assessment. For example, the wettability measurement instrument captures an image of a droplet contacting the proppant sample. The wettability measurement instrument determines a contact angle of the droplet and the proppant sample based on the image. The wettability assessment is based on the contact angle.

Figure 15:
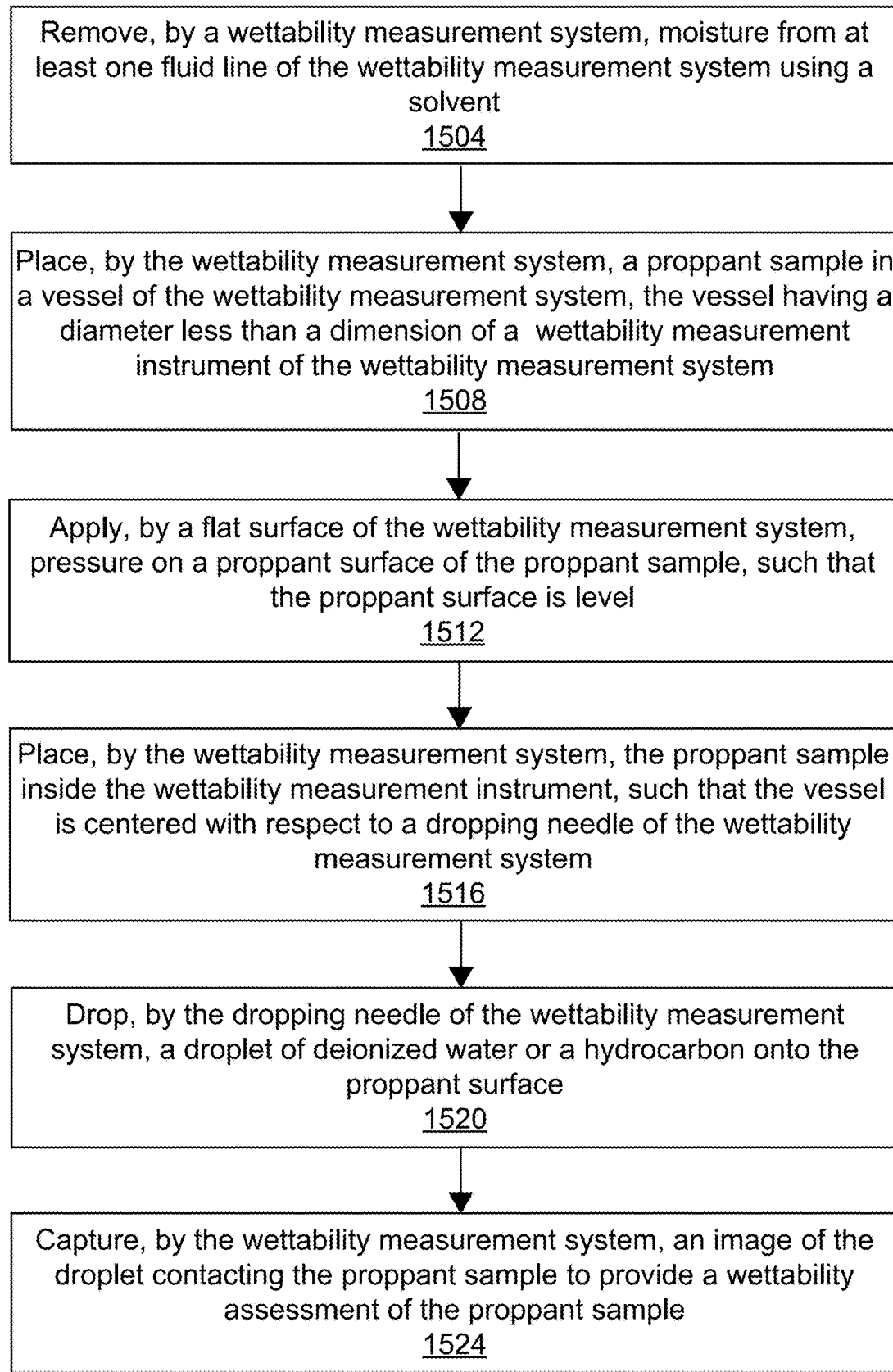
FIG. 15 illustrates an example process for wettability assessment of fracturing proppants, in accordance with one or more implementations.

FIG. 15 illustrates an example process for wettability assessment of fracturing proppants, in accordance with one or more implementations. In some implementations, the process illustrated in FIG. 14 is performed by the wettability assessment system illustrated and described in more detail with reference to FIGS. 1, 11, and 13.

A wettability measurement system removes (1504) moisture from at least one fluid line of the wettability measurement system using a solvent. In some implementations, prior to measuring the contact angle, the wettability measurement system removes moisture from at least one fluid line of the wettability measurement system using a solvent. To prepare the system for contact angle measurement, the wettability measurement system is calibrated. The fluid lines are cleaned and dried. For example, solvents are used to ensure the absence of fluids inside the lines. This step is performed to prevent fluid remains (for example, leftover fluids from previous measurements) that can mix with the testing phase, and alter its properties and affect the wettability results.

The wettability measurement system injects (1508) a proppant sample into a vessel 1200 of the wettability measurement system. The vessel 1200 is further illustrated and described with reference to FIG. 12. In some implementations, the vessel 1200 has a diameter less than a dimension of the wettability measurement instrument, described in more detail with reference to FIG. 1. For example, the proppant sample is injected into a transparent semi-cylindrical vessel having an outer diameter that is less than an inner dimension of the wettability measurement instrument.

A flat surface of the wettability measurement system applies (1512) pressure on a proppant surface of the proppant sample, such that the proppant surface is level. For example, the vessel 1200 is filled with the proppant sample and a pressure is applied to the surface of the proppant sample by a flat surface. The flat surface can be a surface of the cap 600, illustrated and described in more detail with reference to FIG. 6. The application of the pressure is repeated until the proppant surface is optimally leveled. The proppant surface is leveled to reduce the effect of spaces between proppant particles.

The wettability measurement system places (1516) the vessel 1200 into a wettability measurement instrument, such that the vessel 1200 is centered with respect to a dropping needle of the wettability measurement system. The implementations disclosed herein enable and facilitate numerical wettability measurement of small spherical surfaces (for example, having a mesh size of 5-80) using a pendant drop method based on the KRUSS drop shape analysis (DSA)-100. The wettability measurement system can include a wettability measurement instrument, such as the KRUSS DSA-100, an actuator (such as implemented in a robotic arm) to perform physical actions on the vessel 1200 and the wettability measurement instrument, and a computer system 1302 to control the wettability measurement instrument and the actuator. The computer system 1302 is further illustrated and described with reference to FIG. 13.

The dropping needle of the wettability measurement system applies (1520) a droplet of deionized water or a hydrocarbon onto the proppant surface. In some implementations, the proppant sample is positioned inside the wettability measurement instrument, such that the droplet contacts the proppant sample at a location greater than a threshold distance from a wall of the vessel 1200. Thus, wall effect is reduced or eliminated. The droplet is prevented from touching or approaching the walls of the vessel 1200 using the disclosed implementations. When traditional methods are used, touching or being close to a vessel wall can cause the droplet's adhesion to be dominated by the wettability of the vessel itself and not the proppant sample.

For example, when water is applied to a graduated cylinder, the fluid surface will be curved creating a meniscus caused by the fluid's attachment to the walls. Using the implementations disclosed herein, the proppant sample is positioned accurately below the dropping needle instead to mitigate wall effect. In some implementations, the size of the vessel 1200 is increased, further decreasing the wall effect, for example, in case a wall effect is observed.

The wettability measurement system captures (1524) an image of the droplet contacting the proppant sample to provide a wettability assessment of the proppant sample. In some implementations, the image of the droplet contacting the proppant sample is captured within a threshold time after the droplet is applied onto the proppant surface. For example, after the droplet is released, the image is frozen within a threshold time in a range of seven to twelve seconds. The threshold time is designed to mitigate the effects of pore spaces between proppant particles. In some implementations, the wettability measurement system (for example, the computer system 1302) determines the contact angle of the droplet and the proppant sample based on the image.

The computer system 1302 is further illustrated and described with reference to FIG. 13. The wettability assessment is based on the contact angle. For example, the contact angle of the proppant sample with the droplet phase is computed using software on the computer system 1302. The wettability assessment can include computing the indices illustrated and described in more detail with reference to FIG. 5.

FIG. 16 illustrates an example process for identifying a wettability index of fracturing proppants, in accordance with some implementations. The technique may include determining, at 1604 for a proppant sample, a first value related to an oil-wet index of the proppant sample. The first value may be, for example, OWI as described above with respect to FIG. 3.

The technique may further include determining, at 1608 for the proppant sample, a second value related to a water-wet index of the proppant sample. The second value may be, for example, WWI as described above with respect to FIG. 3.

The technique may further include determining, at 1612 for the proppant sample based on the first value and the second value, a third value related to a wettability index of the proppant sample. The third value may be, for example, WI as described above with respect to FIG. 3.

The technique may further include determining, at 1616 based on the third value, a wetting characteristic of the proppant sample. As previously noted, the WI index values may range from −1, which characterizes a strong oil wettability character (e.g., a wettability characteristic) to 1, indicating a strong water wettability character (e.g., another wettability characteristic).

In some embodiments, the technique may include performing a hydraulic fracturing procedure that includes the proppant based on the wetting characteristic of the proppant. For example, the wetting characteristic may serve as the basis for selection of a particular proppant for a hydraulic fracturing procedure, the amount of proppant used, whether one proppant is mixed with another, etc.

It will be understood that techniques such as those of FIGS. 14-16 are intended as example techniques, and may vary in other embodiments. For example, elements may be performed in an order differently than depicted, concurrently with one another, etc. Some embodiments may include more or fewer elements than depicted. Other variations may be present.

What is claimed is:

1. A method comprising:

injecting a proppant sample into a vessel wherein, the vessel compacts the proppant sample inside the vessel;

applying pressure on a proppant surface of the proppant sample by a flat surface to reduce spaces between particles of the proppant sample, such that the proppant surface is level;

applying a droplet of deionized water or a hydrocarbon onto the level proppant surface; and capturing an image of the droplet contacting the proppant sample to provide a wettability assessment of the proppant sample.

2. The method of claim 1, further comprising determining a contact angle of the droplet and the proppant sample based on the image, wherein the wettability assessment is based on the contact angle.

3. The method of claim 1, further comprising heat aging the proppant sample to remove moisture from the proppant sample.

4. The method of claim 1, wherein the droplet is applied by a pendant drop method.

5. The method of claim 1, wherein the proppant sample is positioned inside the vessel, such that the droplet contacts the proppant sample at a location greater than a threshold distance from a wall of the vessel.

6. The method of claim 1, wherein the image of the droplet contacting the proppant sample is captured within a threshold time after the droplet is applied onto the proppant surface.

7. The method of claim 1, wherein the vessel is level.

* * * * *